US011195193B2

United States Patent
Liu et al.

(10) Patent No.: US 11,195,193 B2
(45) Date of Patent: Dec. 7, 2021

(54) SYSTEM AND METHOD FOR PRICE TESTING AND OPTIMIZATION

(71) Applicant: Home Depot Product Authority, LLC, Atlanta, GA (US)

(72) Inventors: Xingchu Liu, Atlanta, GA (US); Lukas Bouvrie, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 67 days.

(21) Appl. No.: 16/411,973

(22) Filed: May 14, 2019

(65) Prior Publication Data

US 2019/0347681 A1 Nov. 14, 2019

Related U.S. Application Data

(63) Continuation of application No. 13/841,629, filed on Mar. 15, 2013, now Pat. No. 10,290,012.

(60) Provisional application No. 61/730,801, filed on Nov. 28, 2012.

(51) Int. Cl.
*G06Q 30/02* (2012.01)
(52) U.S. Cl.
CPC .............................. *G06Q 30/0206* (2013.01)
(58) Field of Classification Search
None
See application file for complete search history.

(56) References Cited

U.S. PATENT DOCUMENTS

| | | |
|---|---|---|
| 4,996,642 A | 2/1991 | Hey |
| 6,041,311 A | 3/2000 | Chislenko et al. |
| 6,085,186 A | 7/2000 | Christianson et al. |
| 6,606,625 B1 | 8/2003 | Muslea et al. |
| 6,728,706 B2 | 4/2004 | Aggarwal et al. |
| 7,117,163 B1 | 10/2006 | Iyer et al. |
| 7,519,621 B2 | 4/2009 | Harik |
| 7,702,700 B2 | 4/2010 | Lee |
| 7,970,713 B1 | 6/2011 | Gorelik et al. |
| 8,126,779 B2 | 2/2012 | Wanker |

(Continued)

FOREIGN PATENT DOCUMENTS

WO 2010/104619 9/2010

OTHER PUBLICATIONS

Office Action issued in MX/a/2013/013866, dated Feb. 11, 2016, 6 pgs.

(Continued)

*Primary Examiner* — Sujay Koneru
(74) *Attorney, Agent, or Firm* — Greenberg Traurig, LLP

(57) ABSTRACT

A method includes generating a control set, based on input received via a user interface, the control set comprising at least a first product of a product category type. The method further includes generating a test set, based on input received via the user interface, the test set comprising at least a second product of the product category type other than the first product in the control set. The method further includes changing a feature of the second product in the test set, the feature being visible on a web page via the internet, while maintaining the feature of the first product in the control set. The method further includes measuring competitor or consumer responses to the changing. The method further includes generating a recommendation based on the measured competitor or consumer responses.

17 Claims, 7 Drawing Sheets

(56) References Cited

U.S. PATENT DOCUMENTS

| | | |
|---|---|---|
| 8,140,381 B1 | 3/2012 | Wu et al. |
| 8,165,925 B2 | 4/2012 | Vailaya et al. |
| 8,386,298 B2 | 2/2013 | Bai et al. |
| 8,473,341 B1* | 6/2013 | Walker .............. G06Q 30/0207 705/14.34 |
| 8,719,142 B1 | 5/2014 | Odom |
| 8,818,838 B1 | 8/2014 | Sharma |
| 9,223,871 B2 | 12/2015 | Mallapragada |
| 2001/0051932 A1* | 12/2001 | Srinivasan ......... G06Q 30/0273 705/400 |
| 2003/0004831 A1* | 1/2003 | Owens ............... G06Q 30/0613 705/14.4 |
| 2003/0110066 A1 | 6/2003 | Walser et al. |
| 2003/0171978 A1 | 9/2003 | Jenkins et al. |
| 2003/0177103 A1 | 9/2003 | Ivanov et al. |
| 2004/0143508 A1 | 7/2004 | Bohn et al. |
| 2004/0267762 A1 | 12/2004 | Tunning et al. |
| 2007/0038620 A1 | 2/2007 | Ka et al. |
| 2007/0130090 A1 | 6/2007 | Staib et al. |
| 2007/0226082 A1 | 9/2007 | Leal |
| 2007/0244883 A1 | 10/2007 | Bessieres et al. |
| 2007/0299743 A1 | 12/2007 | Staib et al. |
| 2008/0046316 A1 | 2/2008 | Shah et al. |
| 2008/0109232 A1* | 5/2008 | Musgrove ............ G06Q 30/018 705/317 |
| 2008/0270398 A1* | 10/2008 | Landau ................. G06Q 30/02 |
| 2008/0294499 A1 | 11/2008 | Han et al. |
| 2008/0313165 A1 | 12/2008 | Wu et al. |
| 2009/0076989 A1* | 3/2009 | Probst .................... G06N 7/005 706/14 |
| 2009/0125549 A1 | 5/2009 | Li et al. |
| 2009/0144101 A1 | 6/2009 | Malov |
| 2009/0164383 A1* | 6/2009 | Rothman ............ G06Q 30/0206 705/80 |
| 2009/0222297 A1* | 9/2009 | Cao .................... G06Q 30/0283 705/400 |
| 2009/0299906 A1* | 12/2009 | Moshal ................. G06Q 30/08 705/80 |
| 2010/0010273 A1 | 1/2010 | Belfadhel et al. |
| 2010/0083270 A1 | 4/2010 | Kline et al. |
| 2010/0281389 A1 | 11/2010 | Hutchinson |
| 2010/0306031 A1 | 12/2010 | Mccauley et al. |
| 2011/0040611 A1 | 2/2011 | Simmons et al. |
| 2011/0106581 A1 | 5/2011 | Rohrbasser et al. |
| 2011/0153385 A1 | 6/2011 | Bateni et al. |
| 2011/0191181 A1 | 8/2011 | Blackhurst et al. |
| 2011/0209048 A1 | 8/2011 | Scott et al. |
| 2011/0213644 A1* | 9/2011 | Phene ................. G06Q 30/0207 705/14.1 |
| 2011/0270628 A1 | 11/2011 | Mital et al. |
| 2011/0320478 A1 | 12/2011 | Carlson et al. |
| 2012/0046998 A1* | 2/2012 | Staib .................. G06Q 30/0245 705/7.35 |
| 2012/0203760 A1 | 8/2012 | Abraham et al. |
| 2012/0259891 A1 | 10/2012 | Edoja |
| 2012/0284113 A1 | 11/2012 | Pollak |
| 2012/0296792 A1 | 11/2012 | Levoff et al. |
| 2012/0330934 A1 | 12/2012 | Duboue et al. |
| 2013/0166348 A1 | 6/2013 | Scotto |
| 2013/0275292 A1 | 10/2013 | Cappucci et al. |
| 2014/0108308 A1 | 4/2014 | Stout et al. |
| 2014/0136278 A1 | 5/2014 | Carvalho |
| 2014/0136283 A1 | 5/2014 | Carvalho et al. |
| 2014/0136285 A1 | 5/2014 | Carvalho |
| 2014/0136494 A1 | 5/2014 | Mallapragada |
| 2014/0136549 A1 | 5/2014 | Mallapragada et al. |
| 2014/0379535 A1 | 12/2014 | Briet et al. |

OTHER PUBLICATIONS

Office Action issued in MX/a/2013/013866, dated Sep. 14, 2016, 7 pgs.
Office Action dated Dec. 23, 2014, issued in U.S. Appl. No. 13/841,136.
Response to Office Action dated Jun. 23, 2015, filed in U.S. Appl. No. 13/841,136.
Final Office Action dated Jul. 10, 2015, issued in U.S. Appl. No. 13/841,136.
Examiner's Report dated Aug. 28, 2015, issued in related Canadian Patent Application No. 2833502.
Office Action dated Jan. 9, 2015, issued in U.S. Appl. No. 13/841,322.
Response to Office Action dated Jul. 9, 2015, filed in U.S. Appl. No. 13/841,322.
Final Office Action dated Aug. 4, 2015, issued in U.S. Appl. No. 13/841,322.
Office Action dated Jan. 16, 2015, issued in U.S. Appl. No. 13/837,644.
Response to Office Action dated Jul. 16, 2015, filed in U.S. Appl. No. 13/837,644.
Final Office Action dated Sep. 25, 2015, issued in U.S. Appl. No. 13/837,644.
Kushmerick, N.: "Wrapper Induction for Information Extraction", Ph.D. Dissertation, University of Washington, (1997), pp. 1-264.
Kushmerick, N. et al.: "Wrapper Induction for information Extraction", Int. Joint Conf. AI., (2007), 7 pages.
Kushmerick, N. et al.: "The Wrapper Induction Environment", Proceedings on the Workshop on Software Tools For Developing Agents (AAAI), (1998), pp. 131-132.
Qu, H.: "Wrapper induction: Construct wrappers automatically to extract information from web sources", CMPT 882 Presentation, (Mar. 28, 2001), 4 pages.
Examiner's Report dated Apr. 9, 2015, issued in corresponding Canadian Patent Application No. 2833356.
Notice of Allowance dated Jul. 27, 2015, issued in U.S. Appl. No. 13/837,961.
Office Action dated Nov. 19, 2014, issued in U.S. Appl. No. 13/838,195.
Response to Office Action dated May 19, 2015, filed in U.S. Appl. No. 13/838,195.
Final Office Action dated Jun. 18, 2015, issued in U.S. Appl. No. 13/838,195.
Response to Final Office Action dated Dec. 17, 2015, filed in U.S. Appl. No. 13/838,195.
Office Action dated Jan. 13, 2016, issued in U.S. Appl. No. 13/838,195.
Office Action dated Jan. 30, 2015, issued in U.S. Appl. No. 13/841,487.
Response to Office Action dated Jul. 30, 2015, filed in U.S. Appl. No. 13/841,487.
Final Office Action dated Oct. 29, 2015, issued in U.S. Appl. No. 13/841,487.
Office Action issued in Canadian Patent Appln No. 2,834,892, dated Aug. 14, 2020, 5 pgs.

* cited by examiner

Test Types

500

| Strategy | Potential Products | Benefit |
|---|---|---|
| Increase margin% | Product with a high price position on the market | Improved overall margin |
| | Low margin – a small increase in price may not affect volume much but will dramatically improve the margin | Lead the market to a higher margin level |
| Increase discount% | Price position is low on the market | Improved sales volume with incremental market share |
| | High margin – this allows more room to move the prices | Low risk to the business (it's likely that the current revenue associated with this type of products is low) |
| Increase price spread | Product sold through multiple sites | Price differentiation leads to higher profit |
| | Price position is medium to high on the market | Price based upon the value of brand |

FIG. 5

FIG. 6

Move down Price Position 700

LG LW1210HR 12,000 BTU 208/230V Cool/Electric Heat $337 online, $459 nearby
★★★★★ 47 reviews  ☑ Recommend this on Google 12,000 BTU · Window · LG · With Heater

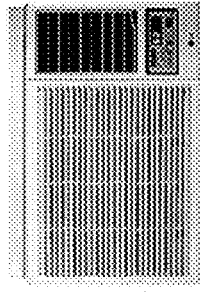

LG WINDOW AIR CONDITIONERS 12,000 BTU Cooling / 11,230 BTU Heating Air Conditioner LG window air conditioners are compact units with cooling and heating for year-round climate control. Fits in most windows for efficient cooling and heating where its needed. Include remote control for ease of use and operation. Features 12 hour timer, 2-speed fan control, auto-sleep mode and auto-restart. 60-86 F temperature range. Dehumidification mode. Temperature display on indoor unit. High efficiency EER rating. Installation kit included.

| Relevance | Seller rating | Condition | Tax and shipping (estimated) | Total price ▲ | Store price |
|---|---|---|---|---|---|
| eBay | No rating | Refurbished | No tax + Free shipping | $337.00 | $337.00 |
| eBay - jeffsandsam | ★★★★★ 1,343 seller ratings | Refurbished | No tax + Free shipping | $339.00 | $339.00 |
| OverStock.com | ★★★★★ 4,967 seller ratings | Refurbished | No tax + Shipping $2.95 | $366.94 | $365.99 |
| Compact Appliance | ★★★★★ 1,527 seller ratings | New | No tax + Free shipping | $410.40 | $410.40 |
| CompactAppliance | No rating | New | No tax + Shipping $36.00 | $432.00 | $337.00 |
| Cactechnology | No rating | New | No tax + Shipping $5.99 | $445.99 | $439.99 |
| Gandget Needs | No rating | New | No tax + Free shipping | $456.00 | $468.00 |
| TronDeal.com | No rating | New | No tax + Free shipping | $479.40 | $479.40 |
| The Home Depot | ★★★★★ 3,802 seller ratings | New | Tax $40.16 + Free shipping | $499.16 | $459.00 |
| Valley of the Sun | 5 seller ratings | New | No tax + Shipping $38.20 | $513.20 | $475.00 |

*FIG. 7*

Optimize Price Distribution and Positions — 800

EdgeStar 6 Place Setting Energy Star Countertop Dishwasher - Silver $211 online
★★★★★ 25 reviews  Recommended this on Google

2 in Countertop Dishwashers

EdgeStar - Countertop - 17 inch - Energy Star Qualified

| Sellers ▼ | Seller rating | Condition | Tax and shipping (estimated) | Total price | Base price |
|---|---|---|---|---|---|
| Amazon.com | ★★★★★ 7,493 seller ratings | New | No tax + Shipping $50.00 | $265.05 | $215.05 |
| Overstock.com | ★★★★★ 4,597 seller ratings | New | No tax + Shipping $2.95 | $270.35 | $267.40 |
| Newegg.com – Living Direct | 6 seller ratings | New | Tax: $24.41 + Free shipping | $303.41 | $279.00 |
| Compact Appliance | ★★★★★ 1,527 seller ratings | New | No tax + Free shipping | $265.05 | $265.05 |
| eBay – compactappliances | ★★★★★ 493 seller ratings | New | No tax + Shipping $50.00 | $294.00 | $264.00 |
| Electrical Collection | No rating | New | No tax + Shipping $62.69 | $279.03 | $216.75 |
| EdgeStar | No rating | New | No tax + Free shipping | $289.99 | $289.99 |
| eBay | No rating | New | No tax + Shipping $40.00 | $319.99 | $279.99 |
| Buy.com – Overstock | No rating | New | | | $367.40 |
| TreeDeal.com | No rating | New | No tax + Free shipping | $279.00 | $279.00 |
| Buy.com – Living Direct | No rating | New | Free shipping | | $294.00 |

- Same customer owns the product and pricing on multiple sites
- In-house brand dominates the market
- The whole price distribution could move up
- Well known site may justify a higher price

*FIG. 8*

SYSTEM AND METHOD FOR PRICE TESTING AND OPTIMIZATION

CROSS-REFERENCE TO RELATED APPLICATIONS

This application is a continuation of and claims priority to U.S. patent application Ser. No. 13/841,629 (now granted as U.S. Pat. No. 10,290,012), filed Mar. 15, 2013, and entitled "SYSTEM AND METHOD FOR PRICE TESTING AND OPTIMIZATION," which is hereby incorporated by reference in its entirety. This application also claims priority to U.S. Provisional Patent Application No. 61/730,801, filed Nov. 28, 2012, and entitled "SYSTEM AND METHOD FOR PRICE TESTING AND OPTIMIZATION," which is hereby incorporated by reference in its entirety. This application is also related to, commonly assigned U.S. patent application Ser. No. 13/841,322 (now granted as U.S. Pat. No. 9,928,515), filed Mar. 15, 2013 and entitled "SYSTEM AND METHOD FOR COMPETITIVE PRODUCT ASSORTMENT," U.S. patent application Ser. No. 13/837,644, filed Mar. 15, 2013, and entitled "SYSTEM AND METHOD FOR AUTOMATIC WRAPPER INDUCTION BY APPLYING FILTERS," U.S. patent application Ser. No. 13/837,961 (now granted as U.S. Pat. No. 9,223,871), filed Mar. 15, 2013, and entitled "SYSTEM AND METHOD FOR AUTOMATIC WRAPPER INDUCTION USING TARGET STRINGS," and U.S. patent application Ser. No. 13/838,195, filed Mar. 15, 2013, and entitled "SYSTEM AND METHOD FOR AUTOMATIC PRODUCT MATCHING," the disclosures of which are incorporated by reference in their entirety. Copies of U.S. patent application Ser. Nos. 13/841,322, 13/837,644, 13/837,961, and 13/838,195, are attached hereto as Appendices A, B, C, and D respectively.

TECHNICAL FIELD

This disclosure relates generally to the field of pricing retail products and particularly to revenue management, price sensitivity analysis and price optimization of retail products in an online environment.

BACKGROUND

Competitive intelligence as it relates to pricing has been an important aspect of the retail business for decades. Today, via the internet consumers have tools that allow them to compare prices across thousands of retailers in seconds.

Many retailers carry a very large number of products on their catalog, often times m excess of 100,000 different stock keeping units (SKUs) associated with different products. Each SKU is often sold by many different competitors at different prices. However, competitors may change their prices for products at any time, which makes it more difficult to determine the pricing of the products at different retailers. Different retailers selling a plurality of products at different prices create a massive amount of information to be analyzed on a timely manner. Because of the massive amount of information associated with competitive intelligence, oftentimes retailers find themselves with product prices that are either too high or too low. A retailer having sub-optimal product pricing can results in either low sales or poor margins.

Current price optimization and sensitivity analysis techniques rely primarily on historical pricing data and consumer facing website click stream data. These solutions simply react to fluctuating sales volumes and do not take into account how competitors react and respond to price changes to a product on a channel, pricing and promotions and freight pricing strategies. To this end, there is a need for improved systems and methods for revenue management, price sensitivity analysis and price optimization utilizing competitive data and web analytics.

SUMMARY

Embodiments disclosed herein include a system that may determine web pages of competitors containing products relevant to a customer of the system. One example of such a customer may be a business entity. One example of a business entity can be a retailer. This retailer may be selling a product and is interested in information relating to that product or similar ones from its competitors, including known and unknown competitors. These competitors may have a presence on the Internet. The system may be configured to pull information associated with products or product types from an unbound number of domains on the Internet. Examples of information associated with a product may include a product name, associated competitor's name, brand, description, product attributes, SKU, price, image, time, date etc. These competitors as well as their domains and websites may or may not be known by a customer requesting the information. The pulled information associated with a product may be stored in a data store, and may be included as an instance in a product table where the pulled information associated with a product from a competitor is arranged in the same row of the product table.

In this disclosure, the term "domain" is used in the context of the hierarchical Domain Name System (DNS) of the Internet. Those skilled in the art appreciate that the DNS refers to a hierarchical naming system for computers or any resource connected to the Internet. A network that is registered with the DNS has a domain name under which a collection of network devices are organized. Today, there are hundreds of millions of websites with domain names and content on them. As the number of websites continues to grow, pulling information associated with a product or products from an unbound number of domains on the Internet can be a very complex, tedious, and complicated process.

Embodiments disclosed herein can leverage wrapper induction and wrapper infection methodologies disclosed in Appendix A and Appendix B attached herewith to automate a data mining process across unbounded domains. Additionally, because each competitor may describe or define a product in different ways, it may be desirable or necessary to determine which products sold by different competitors refer to the same product. Embodiments disclosed herein can also leverage a novel approach disclosed in Appendix C attached herewith to match a product or product type of interest with product information crawled from the Internet. This matching process can help to ensure that any price or feature comparison made between a predefined product/product type and products/product types being sold by different competitors on the Internet are the same and/or relevant. Appendices A, B, and C are hereby incorporated by reference in their entireties.

Embodiments as described herein relate to price optimization systems and methods configured to use data of competitor's pricing for products, competitors price responses associated with products based on a customer's changes to prices of products and consumer navigation behavior on a channel associated with the customer that is updated frequently to derive price sensitivity data. Embodiments may acquire competitive data and use this data to improve current price optimization techniques. The effect of adding massive and continuously updated competitive datasets result in more predictable consumer web analytics of a consumer's website over longer periods of time, which may create more robust optimization models configured to handle long-term trends in customer loyalty and price optimization across a wider range of products and/or marketing strategies.

Embodiments described herein may (1) gather data, (2) design tests, (3) run tests, (4) perform sensitivity analysis, and/or (5) create price recommendations for products. In one embodiment, a price testing system and method may gather the following data to optimize pricing of a product: (1) how quickly competitors respond to a change in price for a product, (2) how aggressively competitors change a price of a corresponding product, (3) number of unique visitors/number of visits, (4) conversion rates (i.e., the percentage of visitors to a product page who end up purchasing such a product), (5) exit rates, (6) time spend on an individual web page, and/or (7) other competitive data found online.

Embodiments described herein may design a price optimization test using two groups of products, a control group and a test group. The control group and test group may include products that are the same make and model with similar attributes that have alike online sales. However, the control group and test group may include products with a variable that is different, such as color. For example, in one embodiment a control group may include cherry patio furniture and the test group may include pine patio furniture of the same make and model of the control group.

The price test may cover different price points for products in the test group across multiple channels to optimize everyday pricing, seasonal promotions, inventory clearance, freight pricing and cross sell/up sell data. Determining a price test may include receiving baseline business requirements or rules from a customer, such as a product minimum margin, price relationship, etc. Embodiments may be implemented in a Software-As-A-Service (SAAS) environment. The following provides a set of example factors that may be considered in a price test: (1) price vs. volume, (2) competitors' response to price changes, (3) product cost shipping cost, handling cost, etc., (4) inventory level, inventory replenishment, (5) seasonality, (6) product lifecycle, (7) brand recognition—both product brand and company brand, and/or (8) pricing strategy.

Price testing may then be performed on the control group and the test group. The price testing may then analyze to determine how the products in the control group and the test group are priced against associated products being sold and/or carried by relevant competitors.

The price optimization system may then modify the price of products in the test group, while maintaining the price of the products in the control group, and analyze competitor's price change response to products that are matches to the products in the test group. Embodiments disclosed herein can also leverage a novel approach disclosed in Appendix D attached herewith to compare and/or analyze a competitor's products with the products in the test group, and Appendix D is hereby incorporated in its entirety by reference.

The price optimization system may then analyze the test group to determine if the prices of the products within the test group should be modified and what testing strategy should be implemented on the test group. Utilizing the competitive data, the price optimization system may also determine if it makes sense to modify the price of a product for a test based on the competitor's pricing of the product. In one embodiment, if the consumer's products price is already the lowest price for a product it might not make sense to further lower the price of the product.

While a price test is running, the price optimization system may determine a competitor's responses to price changes of the same product and changes to consumer behavior on the channel in response to the change of pricing data for the test group. The price optimization system may also determine if competitors have modified their pricing of products and how quickly they have changed the pricing of their products as a result of the prices of the products within the test group being modified.

The price optimization system may compile web analytic data associated with a consumers interactions with the customer's channels such as where a consumer is viewing the channel from, did the consumer click through the channel from Google shopping, directly, from a Google Adwords campaign, etc., conversion rate, what website the consumer exited the channel, how much time a consumer spent on the product page, etc. Therefore, while a price test is running, not only may sales be tracked, but additional data associated with the behavior of consumers at different channels may be compiled and stored.

After performing a price sensitivity analysis, data may be compiled based on the web analytics, conversions rates, revenue, etc. between the test group and the control group, changes to the competitors' pricing of the products, and/or web analytics of the various channels to determine an optimized pricing of the customer's products. Price recommendations can then be prepared and delivered or otherwise made available to the customer of the price optimization system. Embodiments create value to the customer through increased revenue and/or profit, and may also be a source of increased revenue for product offering.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of this disclosure, which includes all such substitutions, modifications, additions or rearrangements.

BRIEF DESCRIPTION OF THE DRAWINGS

The drawings accompanying and forming part of this specification are included to depict certain aspects of various embodiments. A clearer impression of these embodiments, and of the components and operation of systems provided with them, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 depicts a table illustrating different type of tests according to one embodiment disclosed herein.

FIGS. 6-8 depict screenshots of example price tests according to embodiments disclosed herein.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

Before discussing specific embodiments, a brief overview of the context of the disclosure may be helpful. In this disclosure, the term "customer" may refer to a customer of the pricing system, "consumer" may refer to an end user of a customer's online shopping engine, "channel" may refer to a virtual or physical avenue with which a customer promotes their product(s), and "product" may refer to a customer's product sold through one of their channels. Example channels may include, but are not limited to, Google Adwords, Google shopping, brick and mortar stores, websites, etc.

Systems and methods described herein enable customers to determine price sensitivity, price elasticity, and price optimization for product segments for cross-selling, up-selling, seasonal promotions, inventory clearance, freight pricing, etc. Embodiments may include a price optimization system configured to design price tests, run the tests, monitor the tests, adjust the tests if desired, and analyze the results of the tests to determine the test's significance, price sensitivity of the product segment, and/or price optimization of the product segment. The results of the tests may be communicated to the customer and be used to determine inputs of further tests for the product segment.

Figure 1:
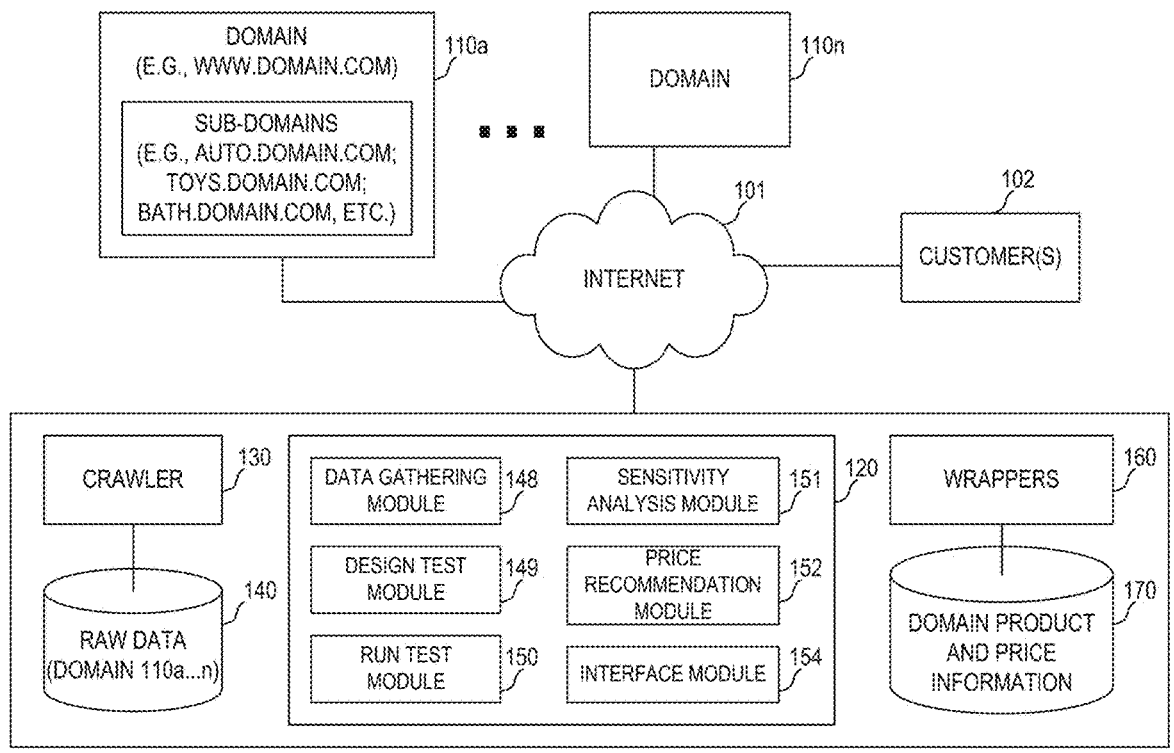
FIG. 1 depicts a block diagram of one embodiment of an architecture in which a price sensitivity and optimization system may be implemented.

Turning now to FIG. 1, a block diagram illustrating an exemplary system 100 is shown. System 100 couples to a network such as the Internet 101 and has access to domains 110$a$ . . . 110$n$. Each domain may have a common network name (domain name) under which a collection of network devices are organized (e.g., domain.com). Each domain may have one or more sub-domains (e.g., abc.domain.com, xyz.domain.com, etc.) according to the hierarchical Domain Name System (DNS) of the Internet. The collection of network devices in a domain may include one or more server machines hosting a website representing the domain (e.g., www.domain.com).

A website (also referred to as Web site, web site, or site) refers to a set of related web pages (also referred to as pages) containing content such as text, images, video, audio, etc. A website can be accessible via a network such as the Internet or a private local area network through an Internet address known as a Uniform Resource Locator (URL). All publicly accessible websites collectively constitute the World Wide Web.

Crawler 130 of system 100 may crawl the Internet 101 across domains 110$a$-110$n$ for data and store them in raw data database 140. The data obtained by crawler 130 may be associated with retail products. Wrappers 160 may be generated using techniques disclosed in Appendix A and/or Appendix B to extract desired information, such as domain product and price information, from the raw data obtained by crawler 130. Other suitable wrapper generation techniques may also be used. The domain product and price information for competitors thus obtained may be stored at database 170.

System 100 may include competitive price optimizer 120. Component 120 may include data gathering module 148, design test module 149, run test module 150, sensitivity analysis module 151, price recommendation module 152 and interface module 154. Functionality of these features will now be described in detail.

Data gathering module 148 may be configured to gather data such as customer channel web analytics, competitor data associated with products, and customer business rules. In one embodiment, the customer website analytics may be obtained via FTP for individual consumers on channels at the product level. Competitor data may be acquired by querying database 170. Customer business rules may be obtained from a customer, and may indicate business rules associated with a product such as lowest allowable margin, season products, etc. Furthermore, data gathering module 148 may identify the top selling products by channel and product category over a period of time, such as the past three months. For the top selling products, data gathering module 148 may be configured to obtain competitors data over the period of time for each product, and it may be desired to design tests for the top selling products.

Design test module 149 may be configured to define test and control groups. Design test module 149 may be configured to determine the test and control groups by selecting a group of products of similar category, sales volume, price, channel and type (i.e. patio chairs, wood in the range of $100-$125 with 500 purchases per month, on Google Shopping Channel). Design test module 149 may then split products into a test and control group based on similarity, where two products that are the most similar based on defined metrics may become the test and control group.

Design test module 149 may be configured to define price points based on competitor data, channel, business rules, and market dynamics for the products in the test group, where only the test group products price points are modified. Each product in the test group may be assigned multiple price points during an executed test.

In one embodiment, if a current price point for a product is too low, the price point for the product in the test group may be increased incrementally. In one embodiment, break-even analysis and customer business rules may be applied to define the price points. The price points may be normalized for seasonality, market dynamics, and design changes on the site/channel. Initially, at the start of a test, design test module 149 may be configured to move up and down the price point of the products in the test groups in smaller increments and increase the increments of the price points of the products in the test group based on current and competitive position of the products in the product group compared to the price points of their competitors, their margin value, etc. Design test module 149 may also be configured to determine the length of a test, which may be any desired length of time.

In one embodiment, design test module 149 may also determine tests based on existing traffic volume of a customer's website, price variation, expected price change and a significance threshold associated with the change of products price, wherein the significance threshold may be associated with product revenue, margin, volume, sales, etc. Design test module 149 may also determine tests based on acceptable impact on the customer's business, the type of competition based on the brand equity of determined competitors, a number of competitors for a product group, and competitors response by channel.

Run test module 150 may be configured to execute a test created by design test module 149. Run test module 150 may be configured to deliver a list of price changes per day for the products in test group, and a customer may change the prices of the products in the test group. In other embodiments, run test module 150 may change the prices of the products in the test group. Run test module 150 may measure customer data associated with a margin, profit, price and volume of the products in the test group and the control group during an executed test. Run test module 150 may also measure changes to competitor's products that are associated with the test group such as the brand equity of the competitor, how the competitor responds to the change in price such as how often and by how much has the competitor changed the price of the products associated with the test group, and the price rank of the products in the test group based on competitor's responses to the price points.

Run test module 150 may also measure web analytics of the customer on different channels, such as the number of unique visits, conversion rates, exit rates, time spent on the webpage, time to first purchase, etc. Run test module 150 may also be configured to intervene with a test if competitor responses are different than what was anticipated, and alter a test mid-test based on the measurements.

Sensitivity analysis module 151 may be configured to test the significance of each price point in the test using any statistical analysis test, such as the chi-squared test. Sensitivity analysis module 151 may also be configured to analyze correlations between individual competitor responses and their effects on web analytics for the customer's channels. In one embodiment, sensitivity analysis module 151 may be configured to generate an ensemble model based on any correlations and price/volume data from the test. Using regression analysis sensitivity analysis module 151 may calculate the elasticity of price based on the generated ensemble model.

Price recommendations module 152 may be configured to recommend a price for products based on the price sensitivity to optimize revenue, profit, sales, etc. The price for the products may be communicated to a customer via any known mechanism such as a data feed. Price recommendations module 152 may continuously monitor the metrics for design test module 149 and correspondingly update the sensitivity calculations and determine an optimized price for corresponding products.

As describe above, a customer of system 100 can interact with system 100 via a user interface provided by interface module 154. Inputs provided by the customer at the front end (e.g., via a web browser running on a client device associated with the customer and implementing an instance of a web based user interface provided by interface module 154) may be communicated to a server machine running system 100 (or a portion thereof, e.g., component 120) at the back end and stored in a data store (not shown) accessible by design test module 149, run test module 150, sensitivity module 151 and price recommendation module 152.

Figure 2:
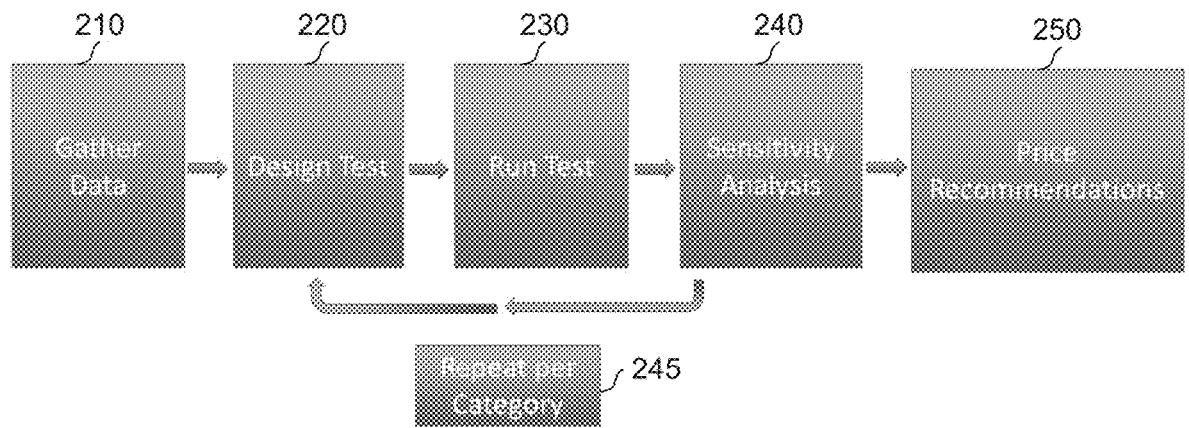
FIG. 2 depicts a flow chart illustrating an example operation of one embodiment of a price optimization system disclosed herein.

FIG. 2 depicts a flow chart illustrating an example operation of one embodiment of a price optimization system. At the data gathering step 210, customer analytics, competitor data, and customer business rules may be gathered. Customer analytics refers to web analytics for a customer's site. Web analytics refers to the measurement, collection, analysis and reporting of internet data for purposes of understanding and optimizing web usage. In this case, the customer site web analytics may provide data on consumer behavior and/or interactions with the customer's site concerning the customer's products. For example, the customer site web analytics can provide site analytics data pertaining to an individual consumer per channel at the product level. In one embodiment, the customer website analytics may be obtained from the customer via FTP. In one embodiment, competitor data may be obtained from database 170. For example, competitor data may be obtained by querying an items table stored in database 170. In one embodiment, business rules may be provided by the customer via an interface generated by interface module 154. Those skilled in the art will appreciate that such an interface can be implemented in various ways. For example, interface module 154 may provide an interview- or wizard-style interface in which an authorized user for the customer answers questions presented to the user and the answers provided by the user are used to formulate business rules. Example questions may include, but are not limited to, "What is the lowest allowable margin?", "Is this a seasonal product?", etc.

In one embodiment, the top selling products by channel and category for a particular time period are identified. In one embodiment, the top selling products by channel and category for the past three months may be identified. For these tope selling products, the competitor data for the past three months, including all competitors for each product along with all competitor product data associated therewith, are obtained from the items table stored in database 170.

At the test designing step 220, the customer may design a test via a user interface provided by interface module 154. In one embodiment, in designing a test, an authorized user for the customer may, via the user interface, define a test group and a control group, define price points to test, and define the length of the test. As an example, the system may work with the customer to:

Define Test and Control Groups: (1) Of the top selling products and preferred categories, select a group of 10 products of similar category, sales volume, price, channel and type. For example, a customer may select patio chairs that are made of wood, in the range of $100-$125, have at least 500 purchases per month, and the primary channel being Google Shopping. (2) Split these products into two groups based on similarity: Products that are most similar based on defined metrics are placed in the test and control groups.

Define Test and Control Groups: (1) Each product in the test group can be assigned multiple price points to test based on competitor data and channel. For example, if the current price point is low, the system can move the price up incrementally. See FIG. 5 for example test types. (2) Apply break-even analysis and customer business rules. (3) Normalize for seasonality, market dynamics, and design changes on the customer's site. (4) Price points can move up and down in small increments at the beginning of the test and grow in size toward the end of the test based on current and expected competitive position. For example, price points can move up and down in approximately $0.10 increments at the beginning of the test and grow in size to approximately $1.00 increments toward the end of the test.

Define length of test: (1) Determine existing traffic volume, variation, expected change and significance threshold. In one embodiment, these questions can be answered after the first test run. (2) Determine acceptable impact on business, the type of competition, competitors' responses by channel, etc. The length of a test may depend on the number of big players versus small players, the number of competitors in the same product category and/or channel, etc.

An example operation of designing a price test will be further described below with reference to FIG. 3. At the test running step 230, the system may operate to run the test for the customer. To begin the test, a list of price changes per day for the products in the test group may be delivered to the customer. The customer may, via the above-described interface, change the prices of the products in the test group as per the test design. While the test is being run, the following measurements may be taken: (1) Customer: Margin and profit (price vs. volume), (2) Competition: Brand equity (unique visits), responses (how often, by how much), price rank, (3) Customer: Unique visits, conversion rate, exit rate, time spent on page, time to first purchase.

For example, the system may operate to measure the customer's margin and profit on the products, as well as changes to competitor's products that are associated with the test group such as the brand equity of the competitor, how a competitor responds to the change in price such as how often and by how much has the competitor changed the price of the products associated with the test group, and the price rank of the products in the test group. Also, while the test is being run, web analytics of the customer's channels may be measured. Since competitor responses may be different than anticipated, the test design may be altered mid-test based on measurements taken thus far.

At the sensitivity analysis step 240, the following analyses may be performed: (1) Significance Test—Test the statistical significance of volume change due to price change in the test using a statistical analysis, (2) Competitor Analysis—Test correlations between individual competitor responses and their effects on the customer site web analytics and create an ensemble model based on the correlations and price/volume data from the test, (3) Sensitivity Analysis—Calculate the elasticity of price base on the ensemble model using a regression analysis.

For example, the significance of volume change in the test may be determined using the chi-squared test. The sensitivity of the test may also be analyzed to measure correlations between individual competitor responses and their effects on unique visits, conversion rate, exit rate, time spent on page, time to first purchase, etc. with respect to the customer's channel(s). An ensemble model can be created based on these correlations and price/volume data from the test. Applying a regression analysis on the model, the elasticity of the price for the products may be calculated.

As described above, while designing a test, potential competitor's responses may be considered depending on the channel and the velocity of traffic on the channel. The designed test may also be competed on individual channels for price differentiation.

The above-described steps (design a test, run the test, and analyze the test) may be repeated per category (step 245). The results of each test can be analyzed to determine modifications to consumer's behaviors based on the price points of the products being modified during the price test. The results of the test can also be analyzed to determine recommendations for the customer.

At the price recommendations step 250, once price sensitivity is calculated (which, in one embodiment, produces a number), it can be used to optimize for revenue or profit. In one embodiment, an IBM ILOG CPLEX Optimization software package (also referred to as CPLEX Optimizer) can be used to optimize for revenue or profit based on the calculated price sensitivity. Other optimizers may also be used. Price recommendations to optimize revenue or profit based on the price sensitivity can be delivered or otherwise communicated to the customer in various ways. For example, the system may deliver price recommendations to the customer via a data feed.

The system may, in one embodiment, continuously monitor the metrics outlined in the testing phase described above and update sensitivity calculations and optimized pnce. To this end, price recommendations for the products involved in the test may be continuously monitored, updated, and communicated to the customer.

The following are non-exclusive factors that may be analyzed after completing a test: (1) Price vs. Volume changes, (2) How many key competitors' in the market (at product level)?, (3) Who is the price leader and do other competitors follow?, (4) How often do my competitors change their prices?, (5) Where is a customer's price position now and where should the customer's price position be?, (6) How would my competitors respond to the customer's move?, (7) How much additional volume can the customer gain/lose by changing prices?.

The following is a nonexclusive list of consumer behavior that may be analyzed: (1) # of unique visitors/# of visits, (2) Conversion rate, (3) Exit rate, (4) Time spent on individual page, (5) Time for first visit to purchase.

Figure 3:
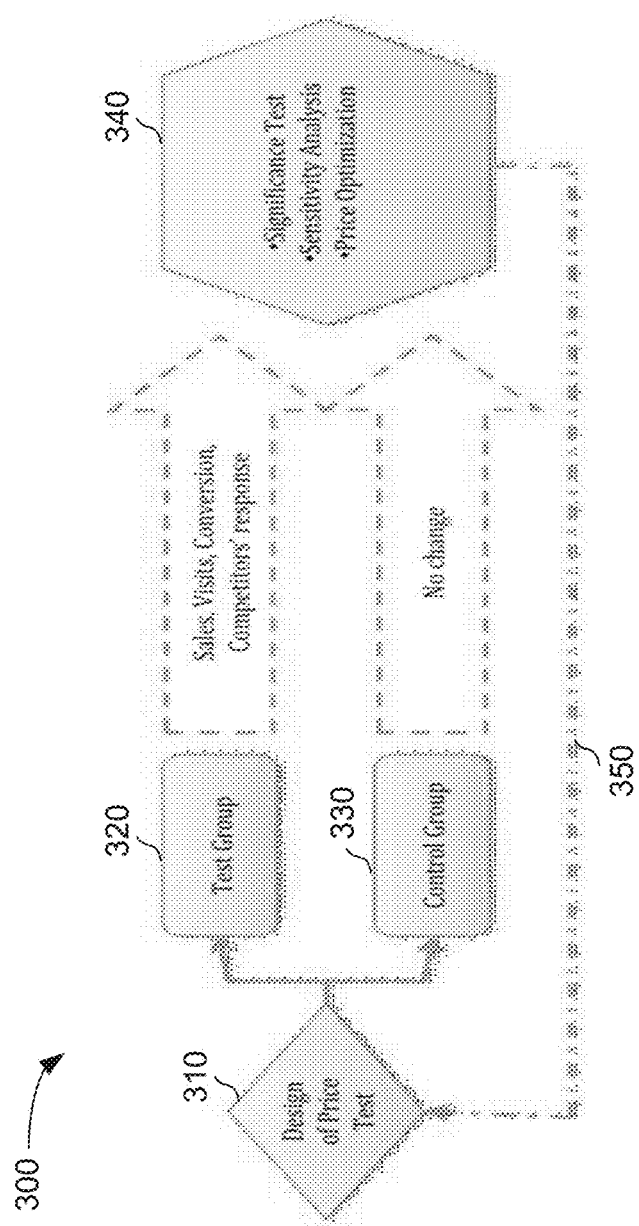
FIG. 3 depicts a flow chart illustrating an example operation of designing a price test.
Figure 4:
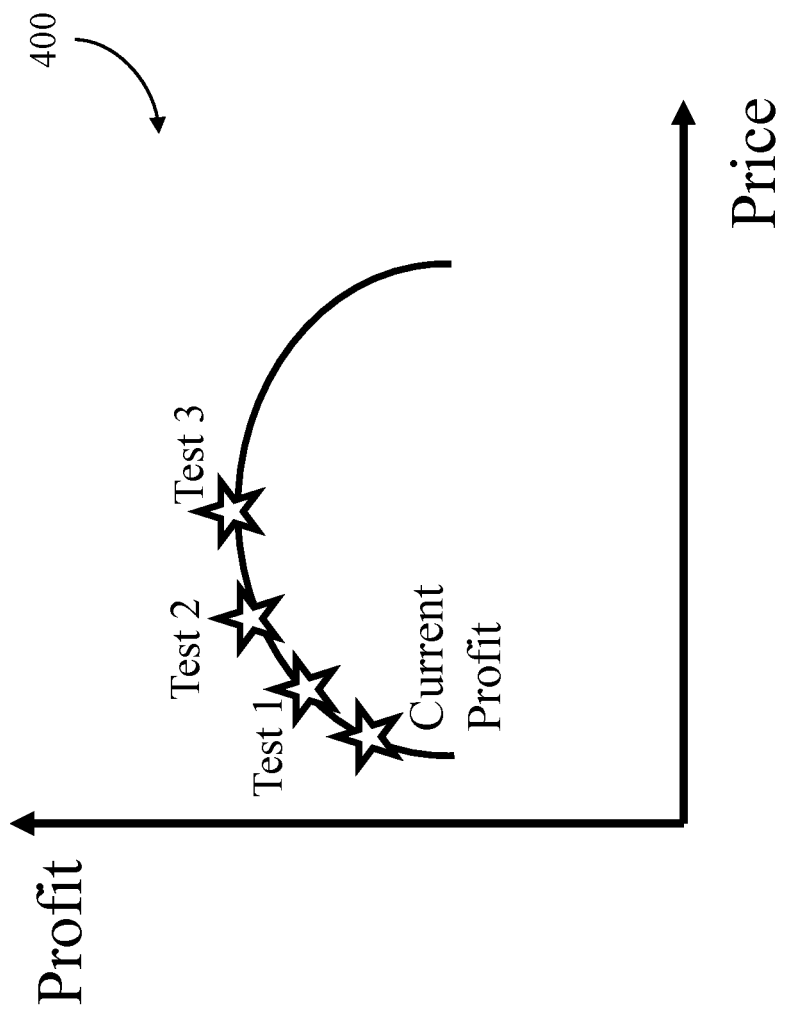
FIG. 4 depicts a flow chart illustrating an example price elasticity curve.

FIG. 3 depicts a flow chart illustrating an example operation of designing a price test. At step 310, a price test may be designed for selected products based on competitor data, channel, business rules, and market dynamics. In one embodiment, if a current price point for a product is too low, the price point for the product may be increased incrementally. The price points may be normalized for seasonality, market dynamics, and design changes on the site/channel. The designed test may include multiple price points for the products in a product group. This allows for the building of a price elasticity curve, an example of which is depicted in FIG. 4, so that the optimal price for revenue, profit, margin, etc. can be determined. The designed test may also be completed over a given length of time as determined by empirical evidence in order to achieve statistical significance.

At steps 320 and 330, a test group and a control group for the selected products that are of similar category, sales volume, price, channel and type may be defined. Each product in the test group may be assigned multiple price points to test. Only the test group products price points are modified. Since only the products in the test group receive price updates, the impact of other factors outside of price changes such as seasonality can be reduced.

At step 340, the significance of the test, the sensitivity of the pricing of the products, and price optimization of the products may be determined based on competitors' responses to the price changes, web analytics of the customer's channels, and market analysis associated with the products corresponding to the designed test. At step 350, additional tests may be designed for the product category, or new tests may be designed for other product categories.

FIG. 4 depicts an example price elasticity curve 400 showing different tested price points and how the price points affect the profit for a product category. More specifically, price elasticity curve 400 shows that, as the price of a product increases the profit associated with the product also increases to a certain point. After the certain point, profits are not increased by increasing the price of the product. In this example, three different price tests are designed, run, and analyzed which, as shown in price elasticity curve 400, may result in possible price recommendations that may optimize the current profit for a product category for a customer.

FIG. 5 depicts a table illustrating different type of tests according to one embodiment. As depicted in FIG. 5, tests may be designed for various purposes. For example, tests may be designed so as to increase a margin percentage, to increase a discount percentage, to increase a price spread, etc. In one embodiment, different testing strategies may be more beneficial to different types of product categories and may result in different testing benefits. Example price tests designed based on different strategies are depicted in FIGS. 6-8.

FIG. 6 depicts an example testing strategy 600 to move up the price position of a product. Products that fit this testing strategy may include those having a price position low on the market and a high margin which allows more room to move the prices. The current revenue of the product could be high or low. If the current revenue of the product is low, the testing of the product will be of low risk to the customer. If the current revenue of the product is high, then it may be desired to analyze channels of the sources of revenue. Some channels may be more sensitive to price changes than others. In this example, a customer "Compact Appliance" carries a product "Panasonic MC-UL915 JetSpin Cyclone—Vacuum cleaner—upright—bagless—red metallic" which has a price position low on the market as compared to the same product carried by their competitors and which has a high margin to allow for possible price adjustments. In one embodiment, a test may be designed to increase the discount percentage. The price optimization system described above may operate to run the test and measure the incremental volume gain caused by the increase in the discount percentage. The results from the test can be used in the sensitivity analysis as described above.

FIG. 7 depicts an example testing strategy 700 to move down the price position of a product. Products that fit this testing strategy may include those having a price position high on the market and a low margin in which a small increase in price may not affect the sale volume of the product but may dramatically improve the margin. In this case, the current revenue of the product should be high. If the current revenue of the product is low, it may not justify the effort to perform an analysis of the product since a price increase will likely lead to even lower revenue. Furthermore, low revenue products may take a long time to test. For high revenue products, the testing may pose an insignificant risk to the customer, although the product should be closely monitored for any change to the sale volume subsequent to each small increase in price. In this example, a customer "Compact Appliance" wants to improve the profit margin on a product "LG LW1210HR 12,000 BTU 208/230V Cool/Electric Heat" which has a price position high on the market as compared to the same product carried by their competitors. In one embodiment, a test may be designed to incrementally increase the price of the product. The price increment may vary along the length of the test. As an example, the price increment may be relatively small, for instance, about 10 cents, at the beginning of the test. The price increment may be increased to about a dollar per an increase toward the end of the best. The price optimization system described above may operate to run the test and measure any increase in the margin and any volume loss subsequent to each increase in the price. The results from the test can be used in the sensitivity analysis as described above.

FIG. 8 depicts an example testing strategy 800 to optimize the price distribution and price position of a product on the market. Products that fit this testing strategy may include in-house products and products with dominating positions through multiple sites. Such products could have a high or low profit margin. The current revenue of the products to be tested should be high as low revenue products have small potential for growth. With this strategy, price differentiation may be optimized among sites and channels, and the value of brand names may be determined. For example, the same product could be sold by the same customer through different channels or sites under different brand names. With this strategy, the product could be priced, tested, and optimized under different brand names for different sites.

Additional price testing strategies may also be possible. For example, in some embodiments, tests may be designed for seasonal promotions where a promotion schema appropriate for market segmentation may generate a higher profit. In some embodiments, tests may be designed for inventory clearance. Without a proper price test, inventory clearance prices could be set too low, leaving revenue under-optimized. In some embodiments, tests may be designed for freight pricing. Customers may offer free shipping. However, a price test may reveal that a reasonable shipping fee may significantly increase the overall profit for large and/or expensive items. In some embodiments, tests may be designed to compare different pricing strategies such as the base price vs. the total price. For example, a lower base price may result in a better price position on shopping sites and thus more traffic, where the total price may ensure a desired margin. In some embodiments, tests may be designed to analyze cross selling and/or up selling. Such a test may be designed at the customer level rather than at the product level. At the customer level, valuable information about consumers may be obtained. Examples of consumer information may include which products consumers browse and which channels they visit, what is common across similar shopping carts or baskets, what price ranges of these products, what other products/websites that they consumers visit (which may be obtained via cookies), etc.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

What is claimed is:

1. A computer-implemented method comprising:
generating a control set, using a processor of a system that is coupled to the internet, based on first input received via a user interface, the control set comprising at least a first product of a product category type;
generating a test set, using the processor, based on second input received via the user interface, the test set comprising at least a second product of the product category type other than the first product in the control set;
changing, using the processor, a feature of the second product in the test set, the feature being visible on a web page via the internet, while maintaining the feature of the first product in the control set, wherein the feature comprises price, and wherein the changing comprises making multiple price changes of different increments;
measuring, using the processor, competitor or consumer responses to the changing of the feature of the second product in the test set, wherein the measuring the competitor or consumer responses to the changing comprises obtaining competitor data from one or more web sites of competitors by:
crawling the internet to obtain raw competitor data from one or more domains associated with the one or more websites of competitors and
applying one or more wrappers to the raw competitor data to automatically extract competitor responses from the raw competitor data; and
generating a recommendation, using the processor, based on the measured competitor or consumer responses.

2. The method of claim 1, wherein the different increments comprises at least one later increment that is larger than an earlier increment.

3. The method of claim 1, wherein the measuring the competitor or consumer responses to the changing comprises collecting internet data comprising at least one of unique visitors to the web page, visitor time spent on the web page, or visitor time from first visit to the web page to purchase of the second product in the test set.

4. The method of claim 3, wherein the generating of the recommendation is further based on the collected internet data.

5. The method of claim 1, further comprising implementing, using the processor, the recommendation such that an adjustment to the feature of the second product of the test set according to the recommendation appears on the web page.

6. The method of claim 1, the measuring of the competitor or consumer responses to the changing comprises at least one of measuring a change in price of at least one competitor product or measuring how quickly the price of the at least one competitor product changed.

7. The method of claim 1, the measuring the competitor or consumer responses comprises:
comparing analytic information with respect to the control set to analytic information with respect to the test set, wherein the analytic information comprises at least one of:
consumer click through information, and
conversion rate,
and wherein the recommendation is further generated based on the comparison.

8. The method of claim 1, wherein the measuring the competitor or consumer responses to the changing comprises collecting, using the processor, customer data comprising behavior of customers in at least one physical store location relating to the second product in the test set.

9. A non-transitory computer readable medium having instructions stored thereon that, upon execution by a computing device, cause the computing device to:
generate a control set, using a processor of a system that is coupled to the internet, based on first input received via a user interface, the control set comprising at least a first product of a product category type;
generate a test set, using the processor, based on second input received via the user interface, the test set comprising at least a second product of the product category type other than the first product in the control set;

change, using the processor, a feature of the second product in the test set, the feature being visible on a web page via the internet, while maintaining the feature of the first product in the control set, wherein the feature comprises price, and wherein the changing comprises making multiple price changes;

measure, using the processor, competitor or consumer responses to the change of the feature of the second product in the test set, wherein the measurement of the competitor or consumer responses to the change comprises obtaining competitor data from one or more web sites of competitors such that the instructions further cause the computing device to:
  crawl the internet to obtain raw competitor data from one or more domains associated with the one or more websites of competitors and
  apply one or more wrappers to the raw competitor data to automatically extract competitor responses from the raw competitor data; and generate a recommendation, using the processor, based on the measured competitor or consumer responses.

10. The non-transitory computer readable medium of claim 9, wherein the recommendation is a recommendation to change at least one of a price of the first product in the control set or a price of the second product in the test set.

11. The non-transitory computer readable medium of claim 9, wherein the recommendation is a recommendation to change a price of a third product of the product category type.

12. The non-transitory computer readable medium of claim 9, where in the recommendation is a recommendation to change a price of the second product in the test set with respect to a particular channel in which the second product is sold.

13. A system comprising:
  a memory; and
  a processor coupled to the memory, wherein the processor is configured to:
    generate a control set, using a processor of a system that is coupled to the internet, based on first input received via a user interface, the control set comprising at least a first product of a product category type;
    generate a test set, using the processor, based on second input received via the user interface, the test set comprising at least a second product of the product category type other than the first product in the control set;
    change, using the processor, a feature of the second product in the test set, the feature being visible on a web page via the internet, while maintaining the feature of the first product in the control set, wherein the feature comprises price, and wherein the changing comprises making multiple price changes;
    measure, using the processor, competitor or consumer responses to the change of the feature of the second product in the test set, wherein the measurement of the competitor or consumer responses to the change comprises obtaining competitor data from one or more web sites of competitors such that the processor is further configured to:
      crawl the internet to obtain raw competitor data from one or more domains associated with the one or more websites of competitors and
      apply one or more wrappers to the raw competitor data to automatically extract competitor responses from the raw competitor data; and
    generate a recommendation, using the processor, based on the measured competitor or consumer responses.

14. The system of claim 13, wherein the user interface is displayed to a user via a web browser running on a client device.

15. The system of claim 13, wherein the measured competitor or consumer responses comprise information relating to at least one of:
  what channel a consumer is viewing a second product page through;
  click through information;
  at what web site or web page the consumer exited the channel;
  an exit rate of a plurality of consumers;
  a conversion rate of the plurality of consumers;
  time from first visit of the consumer to the second product page to purchase of the second product; or
  how much time the consumers spend viewing the second product page.

16. The system of claim 13, wherein the first input specifies the control set by indicating a category type of product, a sales volume, a price, a specific channel, a type of channel, or any combination thereof.

17. The system of claim 13, wherein the processor is further configured to:
  perform a sensitivity analysis configured to test the significance of each price point tested during the change, wherein the recommendation is further generated based on results of the sensitivity analysis.

* * * * *